Jan. 19, 1971     F. J. COSENZA     3,556,570

FASTENER

Filed Aug. 15, 1968     2 Sheets-Sheet 1

INVENTOR
FRANK J. COSENZA
BY
ATTORNEYS

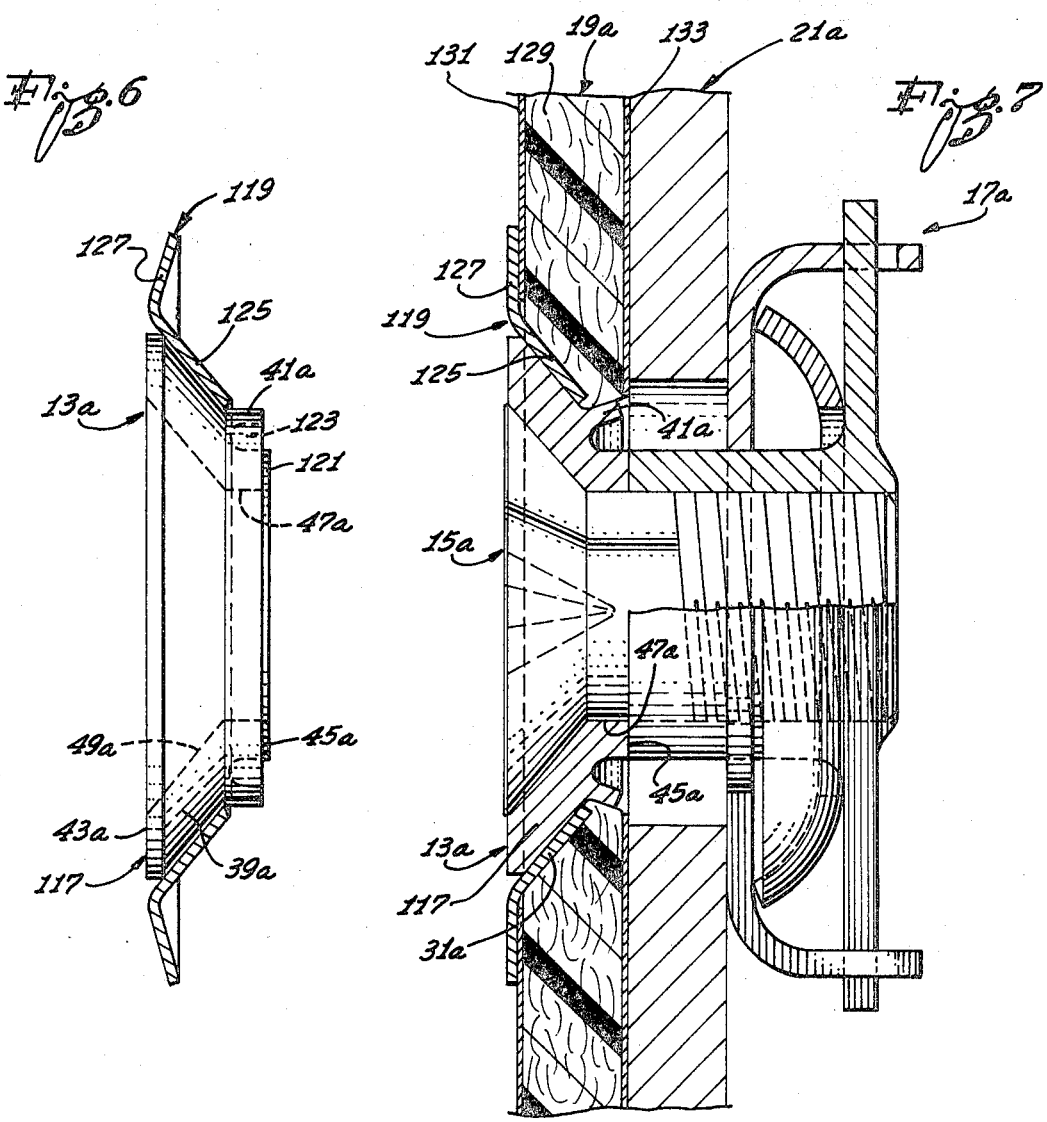

United States Patent Office 3,556,570
Patented Jan. 19, 1971

3,556,570
FASTENER
Frank J. Cosenza, Palos Verdes Peninsula, Calif., assignor to Tridair Industries, Redondo Beach, Calif., a corporation of California
Continuation-in-part of application Ser. No. 657,995, Aug. 2, 1967. This application Aug. 15, 1968, Ser. No. 755,497
Int. Cl. F16b 5/02
U.S. Cl. 287—189.36                13 Claims

ABSTRACT OF THE DISCLOSURE

This disclosure describes a fastener which is particularly adapted for interconnecting two panels having confronting apertures therein. One of the panels has an insert mounted within the aperture thereof. The insert has a passageway extending therethrough and a screw extends through the passageway. A nut is attached to the screw and bears against the insert and also retains the second panel adjacent the first panel. The aperture in the second panel is sufficiently large to permit relative movement of the panels.

---

This application is a continuation-in-part of application Ser. No. 657,995, filed Aug. 2, 1968, now abandoned.

BACKGROUND OF THE INVENTION

Oftentimes it is necessary to interconnect two panels for limited restrained movement relative to each other. In this floating nut plate type of construction the panels are normally clamped together and not subject to relative movement; however, when a load of a predetermined magnitude is applied to one of the panels, the panels are allowed to move relative to each other axially and in a plane generally parallel to each other. Such relative movement or float occurs, for example, when one or more of the panels is subject to deflection or thermal expansion or contraction. In aircraft construction a large amount of float is necessary in the wing and fuselage.

The typical prior art fastener construction is used to interconnect a pair of panel members having aligned apertures therein with one of the apertures being of larger diameter than the other. A screw extends through the smaller aperture until the head thereof bears on the panel having such smaller aperture therein. A nut is attached to the screw and bears on at least the other of the panels to form the panel connection. The nut is tightened to place a relatively small amount of tension on the screw to allow the panels to move laterally relative to each other in response to the application of a force thereto.

One problem with this arrangement is brought about by the fact that the nut bears directly on one of the panels. As the panels slide laterally relative to each other, the entire fastener including the nut slides with one of the panels relative to the other. Thus, the nut rubs repeatedly against the adjacent panel and eventually causes substantial weakening or failure thereof. If the panels move axially toward each other the nut bears on the panel and exerts a gouging effect thereon. This problem is amplified because the panels are usually constructed of relatively thin, soft material such as aluminum or fiberglass which is prone to local failure when subjected to this type of use.

Another problem is caused by the fact that the head of the screw bears directly on the panel through which the screw passes. As the nut is tightened, tension is applied to the screw and this tends to pull the head of the screw through the panel. Thus, the tension applied to the screw often causes local failure of the panel in the region immediately adjacent the screw. This problem is also aggravated by the frequent use of relatively soft materials for the panels and by the necessary relative movement between such soft panels.

SUMMARY OF THE INVENTION

A concept of this invention is to prevent the nut from wearing or rubbing against the panels as the panels move relative to each other to thereby prevent local failure of the panels. The present invention teaches that this can be accomplished by mounting an insert in one of the panels with the insert having a relatively hard bearing surface thereon against which the nut may bear without danger of causing damage to either of the panels.

More particularly, this concept of the invention can be embodied in a fastener for use with first and second members or panels having confronting apertures therein. The insert is mounted in the first panel, has a passageway therethrough and defines a bearing surface adjacent the second panel. A screw member having an enlarged head and a threaded shank portion is positioned within the passageway. Nut means is threadedly attached to the shank portion of the screw member whereby the nut means and the screw member interconnect the first and second panels. The nut means bears against the bearing surface of the insert in lieu of the first panel to protect the first panel.

It is also preferred to prevent the nut means from rubbing against the second panel as the two panels move relative to each other. Thus, the fastener of this invention does not cause failure of either of the panels adjacent the apertures therein.

The present invention also teaches providing a supporting surface or shoulder on the relatively hard insert against which the head of the screw bears. As the insert is constructed of stronger and harder material than the panel in which it is mounted, there is virtually no chance of the head of the screw pulling through or causing failure of the insert when normal loads are applied thereto. The insert is, however, secured to the panel and it may be thought that the panel would be subject to failure at the juncture of the panel and the insert. However, the insert must, of necessity, be of significantly larger diameter than the screw and therefore a relatively large bearing area between the insert and the panel is inherently-provided. Such bearing area is substantially greater than the bearing area that ordinarily exists in prior art fasteners between the head of the screw and the panel itself. Therefore, because of the increased bearing area, it is not likely that the insert will cause local failure of the immediately surrounding portions of the panel.

The present invention is particularly adapted for use with weak panels, i.e., those that are constructed of thin and/or soft materials. It has been found that the bearing surface of the insert and the relatively large diameter of the insert protects the weak panels against local failure to a very significant extent.

Preferably, the insert should be rigidly mounted in the panel. A loose connection between the panel and insert is undesirable because, as the panels move relative to each other, such looseness might permit the insert to exert a rubbing or wearing action against the panel.

To mount the insert on the panel, the end portions of the aperture in the panel are preferably enlarged to define first and second shoulders. The end of the insert remote from the second panel is suitably enlarged to engage one of the shoulders. In one form of the invention, the other of the shoulders in the panel is engaged by an outwardly flared skirt portion of the insert. If the metal of the insert is too hard to permit easy flaring of the skirt portion as by swaging, a snap ring may be utilized in its place to bear against the shoulder to assist in retaining the insert within the aperture.

Another advantage of the invention is that an electrically conductive path through the insert is provided. This can be accomplished by partially encasing the body member in a conductive washer which has a flange portion engageable with the metal surface of one of the panels.

If desired, the insert can extend axially outwardly beyond the aperture in the panel in which it is mounted. However, one advantage of the present invention is that the insert need not project axially beyond the ends of the aperture and may have an axial length substantially equal to the width of the panel. Thus, the insert need not project axially from the panel and therefore it does not increase the length of the fastener and does not add any unnecessary additional weight to the fastener.

The invention, both as to its organization and method of operation together with further features and advantages thereof, may best be understood by reference to the following description taken in connection with the accompanying illustrative drawings.

BRIEF DESCRIPTION OF THE DRAWINGS

FIG. 6 is an elevational view partially in section of another form of insert.

FIG. 7 is a fragmentary sectional view illustrating the insert of FIG. 6 installed in a panel.

DESCRIPTION OF THE PREFERRED EMBODIMENTS

Figure 1:
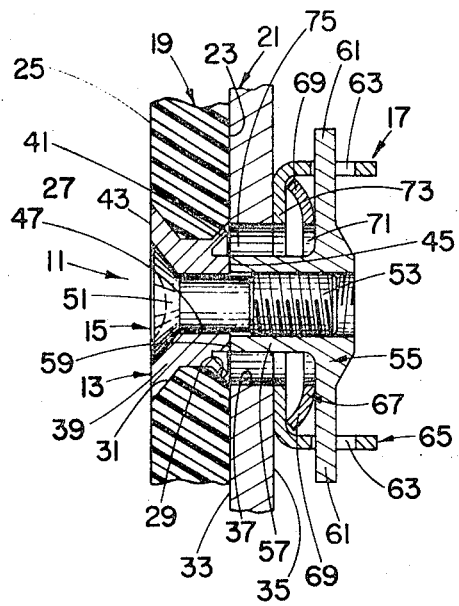
FIG. 1 is a fragmentary longitudinal sectional view of a fastener and two panels.

Referring to the drawings and in particular to FIG. 1 thereof, reference numeral 11 designates a fastener constructed in accordance with the teachings of this invention. Generally, the fastener 11 includes an insert or housing 13, a screw or screw member 15, and nut means 17. The fastener 11 is illustrated in FIG. 1 as being utilized to interconnect two members or panels 19 and 21. Although various arrangements are possible, in the embodiment illustrated, the panel 19 may be considered to be a movable outer panel and the panel 21 may be considered to be a stationary inner panel.

More particularly, the panel 19 is in the form of a sheet of relatively soft material such as fiberglass or aluminum and has an inner face 23 and an outer face 25. The panel 19 has an aperture 27 extending therethrough. The aperture 27 has enlarged inner and outer portions which define annular shoulders 29 and 31, respectively. Although the aperture 27 may have various configurations, in the embodiment illustrated the enlarged end portions are generally frusto-conical and the central section intermediate such enlarged end portions is generally cylindrical.

The inner panel 21 in the embodiment illustrated is somewhat thinner than the outer panel and may, for example, be constructed of aluminum. The inner panel 21 has an inner face 33 and an outer face 35 which, in the position shown in FIG. 1, abuts the inner face 23 of the panel 19. The inner panel 21 has a relatively large aperture 37, which may be of cylindrical configuration extending therethrough confronting, and in registry with, the aperture 27.

The insert 13 includes a body member constructed of a hard material such as steel and in any event is harder than the material from which the panel 19 is constructed. The insert 13 has an enlarged outer end portion 39 which is engageable with and bears on the shoulder 31. Preferably, the outer surface of the end portion 39 is shaped to conform to the shoulder 31. The insert 13 has an annular skirt 41 integral therewith which has been deformed radially outwardly, as by swaging, into engagement with the shoulder 29. Thus, the end portion 39 and the skirt 41 form, in effect, a pair of jaws on the periphery of the insert 13 for gripping the material of the panel 19 surrounding the aperture 27 to firmly and rigidly attach the insert to the panel.

The insert 13 has an outer face 43 which preferably terminates at, and is coplanar with, the face 25 of the panel 19. Preferably, the outer face 43 should not extend significantly axially outwardly beyond the face 25 because this would merely increase the weight and cost of the fastener. The insert 13 also has an annular portion which terminates in an annular inner end which, in the embodiment illustrated, forms a bearing surface 45. The bearing surface 45 preferably terminates substantially at the inner face 23 and in the embodiment illustrated is substantially coplanar therewith. The bearing surface 45 is a hard wear resistant surface. An annular portion 46 terminates in the bearing surface 45 and is spaced inwardly from the skirt 41 to define therewith a generally annular gap.

A passageway 47 extends axially through the insert 13 in registry with and confronting the aperture 37 in the panel 21. The outer end of the passageway 47 is flared outwardly to define a generally frusto-conical supporting surface or shoulder 49.

The screw 15 is a standard screw having an enlarged head 51 and a threaded shank portion 53. As shown in FIG. 1, the supporting surface 49 is shaped to mate with and engage the head 51 to support the latter with the outer surface of the head being substantially flush with the outer face 43 of the insert 13 and the outer face 25 of the panel 19. Of course, the supporting surface 49 may support the head 51 in other positions, if desired. The threaded shank portion 53 extends through the passageway 47 and the aperture 37 as shown in FIG. 1.

Figure 2:
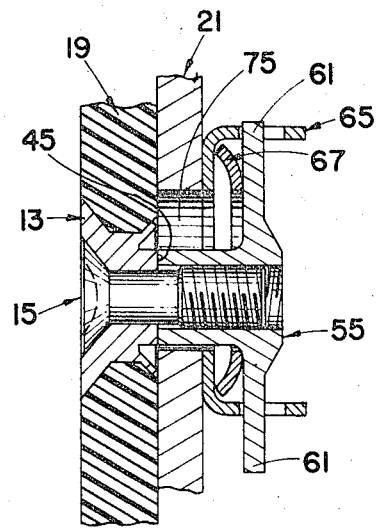
FIG. 2 is a fragmentary sectional view similar to FIG. 1 with the panels having been moved relative to each other from the position illustrated in FIG. 1.

The nut means 17 includes a nut member 55 which is threadedly attached to the threaded shank portion 53. The nut member 55 has a neck portion 57 which extends through the aperture 37 and terminates in a face 59 which forcibly engages the bearing surface 45 when the fastener is tightened. The nut member 55 also has a pair of radially extending arms 61 which are received, respectively, in openings 63 in a bracket 65 which is suitably affixed to the inner panel 21 as by rivets (not shown). A spring 67, which is generally U-shaped in plan and has a pair of spring arms 69 interconnected by a web 71 is urged against a wall 73 of the bracket 65 by the arms 61 of the nut member 55 when the fastener is assembled as shown in FIG. 1. Thus, as the screw 51 is turned to draw the nut member 55 thereon, the arms 61 bear on the spring 67 to force the latter against the wall 73 of the bracket 65. As the bracket 65 is connected to the panel 21, the panel 21 is urged toward the panel 19. As shown in FIGS. 1 and 2, with the fastener assembled, the arms 61 are spaced from the extremities of the openings 63 so that the arms do not bear thereon. The neck portion and the panel 21 define an annular space 75 therebetween.

FIG. 2 illustrates the position of the components of the device after the panel 19 has moved downwardly relative to the panel 21. It can readily be seen that the insert 13, the screw 15, and the nut member 55 all move downwardly with the panel 19 while the bracket 65 and the spring 67 remain stationary with the panel 21. The space 75 is sufficiently large to accommodate all of the anticipated movement or float shown in FIG. 2. Of course, to allow such float to occur the nut member 55 and the screw 15 must not be turned too tightly together. The tension on these members may be, for example, about 25 pounds. Of course, the fastener 11 permits the panel 19 to move a limited amount relative to the panel 21 axially and in any lateral or radial direction, i.e., in any direction in a plane substantially parallel to the panels.

An important feature of this invention is that the nut member 55 bears only against the bearing surface 45 of the insert 13 as shown in FIGS. 1 and 2 and does not bear in any manner on the first panel 19. Nor do the arms 61 of the nut member 55 bear against the panel 21 as these arms act only against the spring 67 to hold the panels 19 and 21 together. Thus, both of the panels 19 and 21 are completely isolated from the deteriorating wear experienced when prior art fasteners are used.

Another important feature of the invention is that the head 51 of the screw 15 bears against the hard supporting surface 49 of the insert rather than against the relatively soft panel 19. Although the end portion 39 of the insert 13 does not bear against the shoulder 31 of the panel 19, this bearing area, being much larger than the ordinary bearing area between a screw head and a panel, is sufficient to prevent failure of the panel 19.

Figure 3:
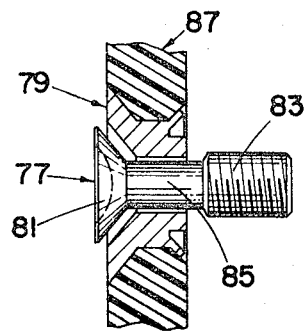
FIG. 3 is a longitudinal fragmentary sectional view similar to FIG. 1 through an outer panel, an insert, and a fully captive screw.

FIG. 3 illustrates a modification of the present invention in which a screw 77 is held captive within an insert 79 by the head 81 of the screw and an enlargement 83 on a shank portion 85 of the screw. The insert 79 may be identical to the insert 13 and is held within the panel 87 as described above in connection with FIGS. 1 and 2. Any suitable nut means such as the nut means 17 may be used in the embodiment of FIG. 3.

Figure 4:
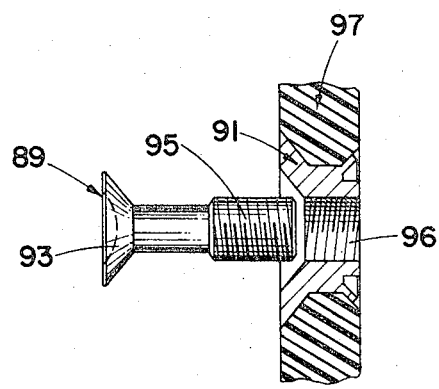
FIG. 4 is a fragmentary sectional view similar to FIG. 3 in which the screw is held partially captive within the insert by the threads thereon.

FIG. 4 shows another modification in which a screw 89 can optionally be held captive in an insert 91 by a head 93 and screw threads 95 on the screw. The insert 91 has internal threads 96 to allow removal of the screw 89 from the insert. The insert 91 may be identical to the insert 13 and may be retained within an outer panel 97 in the manner described above in connection with FIGS. 1 and 2.

Figure 5:
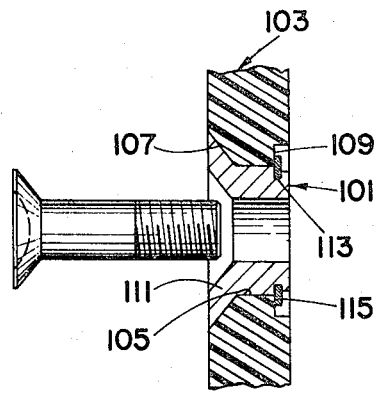
FIG. 5 is a sectional view similar to FIG. 3 showing alternate means for mounting the insert on the panel.

FIG. 5 illustrates an alternate means of securing an insert 101 to an outer panel 103. The panel 103 has an aperture 105 extending therethrough. The aperture 105 has enlarged end portions which define annular shoulders 107 and 109, respectively.

The insert 101 has an enlarged end portion 111 which may be identical to the enlarged end portion 39, shown in FIG. 1, which mates with and engages the shoulder 107. The opposite end of the insert 101 is formed with an annular groove 113 in which a snap ring 115 of conventional design may be placed. The snap ring abuts the shoulder 109 to retain the insert 101 in the panel 103. Thus, the snap ring 115 takes the place of the skirt 41 in the embodiment of FIG. 1. The embodiment of FIG. 5 is preferred where the metal of the insert is too hard to permit easy swaging of the skirt 41. In other respects, the embodiment of FIG. 5 may be identical to the corresponding features discussed above in connection with FIGS. 1 and 2.

The embodiment illustrated in FIGS. 6 and 7 is identical to the embodiment shown in FIG. 1 except as is expressly shown or described and corresponding reference characters followed by the letter *a* are utilized in FIGS. 6 and 7 to designate corresponding parts.

The insert 13a of FIG. 6 includes a body member 117 and a conductive washer 119 with the body member 117 being identical to the corresponding portion of the insert 13 (FIG. 1) except for certain dimensional variations. Thus, the body member 117 has an outer face 43a and an annular inner face or bearing surface 45a which also forms the end face of an annular portion 121 of the body member. In FIG. 6, the skirt 41a is generally cylindrical and is separated from the annular portion 121 by an annular gap 123.

The body member 117 has a passageway 47a extending therethrough with the left end of such passageway defining a frusto-conical bearing surface 49a. Dimensionally, the body member 117 differs from the corresponding portion illustrated in FIG. 1 in that the skirt portion 41a is virtually contiguous to the enlarged frusto-conical end portion 39a whereas in the embodiment of FIG. 1, the skirt portion is spaced axially a noticeable amount from the end portion 39 by a cylindrical peripheral wall portion of the insert.

The washer 119 is preferably constructed of conductive material and in any event is arranged to provide a conductive path through the insert. The washer 119 has a frusto-conical portion 125 sized to fit over the enlarged end portion 39a and a radial flange portion 127 which extends radially outwardly from the plane of the surface 43a. In the relaxed or unrestrained position, the flange portion 127 projects axially inwardly as it extends radially outwardly.

The insert 13a is particularly adapted for installation in a panel 19a (FIG. 7). The panel 19a includes a core 129 of nonconductive material sandwiched between face sheets or skin 131 and 133. The panel 21a (FIG. 7) may be of any suitable construction. The panel 19a is formed with an aperture 27a therein. In forming the aperture 27a, it is inherent that the facing sheets 131 and 133 must be removed. Accordingly, there is no assurance that the body member 117 will contact the conductive face sheets. For some applications, it is necessary or desirable that electrical contact between the fastener and the conductive face sheets be maintained. The present invention assures that such electrical contact will be provided by use of the conductive washer 119. As shown in FIG. 7, the body member 117 is installed in the aperture 27a with the frusto-conical portion 125 of the conductive washer 119 sandwiched between a frusto-conical shoulder 31a on the panel 19a and the outer surface of the body member 117. The flange portion extends radially outwardly and overlaps the face sheet 131 so that electrical contact between the fastener and the face sheet is maintained. The conductive washer 119 should be somewhat resilient so that by securing the body member 117 to the panel 19a, the angle between the portions 125 and 127 can be increased to resiliently bias the flange portion 127 into intimate contact with the face sheet 131. This assures that tight and continuous electrical contact between the face sheet 131 and the fastener will be maintained.

The skirt 45a can be swaged outwardly as shown in FIG. 7 to mount the insert 13a in the aperture 27a of the panel 19a. A screw 15a projects through the passageway 47a and cooperates with nut means 17a as described hereinabove in connection with FIG. 1, to secure the panels 19a and 21a together. It can be seen therefore that the insert 13a functions identically to the insert 13 except for the presence of the conductive washer 119 which provides an electrically conductive path between the fastener elements and the outer face sheet 131.

Although exemplary embodiments of the invention have been shown and described, many changes, modifications, and substitutions may be made by one having ordinary skill in the art without necessarily departing from the spirit and scope of this invention.

I claim:

1. In a fastener for interconnecting first and second members for limited lateral movement relative to each other wherein each of the members has an aperture therein with the apertures being generally confronting, the combination of:

an insert positionable within the aperture of the first member and having a passageway extending therethrough, said insert having a relatively hard bearing surface adjacent the aperture of the second member;

means for mounting said insert on the first member;

a screw member having an enlarged head and a threaded shank portion, said screw member being positionable within said passageway in said insert with the threaded shank portion extending at least partially through said passageway and with the enlarged head preventing the screw member from passing completely through said passageway; and nut means threadedly attached to said shank portion of said screw member, said nut means having a neck portion and a retainer portion, said retainer portion being wider than the aperture in the second member to allow the fastener to interconnect the first and second members, at least one of said neck portion and said insert extending at least partially through the aperture in the second member and having a lesser lateral dimension than the aperture in the second member to allow the first member to move laterally relative to the second member, said neck portion engaging the relatively hard bearing surface on the insert when the fastener is interconnecting the first and second members to thereby prevent the nut means from causing failure of the first member.

2. A combination as defined in claim 1 wherein said insert is extendible axially from said relatively hard bearing surface away from the second member and defines a relatively hard supporting surface for the head of said screw member.

3. A combination as defined in claim 1 wherein the aperture through the first member has enlarged end portions defining a first shoulder remote from the second member and a second shoulder adjacent the second member and said means for mounting includes a correspondingly enlarged end portion on said insert engageable with the first shoulder and means engageable with the second shoulder for assisting in retaining the insert within the aperture against longitudinal movement relative to said aperture.

4. A combination as defined in claim 3 wherein said last mentioned means includes an outwardly formed skirt portion integral with the insert.

5. A combination as defined in claim 3 wherein said last mentioned means includes a snap ring at least partially surrounding the insert and engageable with the second shoulder.

6. In a fastener for interconnecting first and second members for limited lateral movement relative to each other wherein each of the members has an aperture therein with the apertures being generally confronting, the combination of:

an insert positionable within the aperture of the first member and having a passageway extending therethrough, said insert being constructed of harder material than the first member, said insert having a relatively hard bearing surface adjacent the aperture of the second member and a supporting shoulder around the passageway remote from said bearing surface;

means for rigidly mounting said insert on the first member;

a screw member having an enlarged head and a threaded shank portion, said screw member being positionable in said passageway in said insert with the threaded shank portion extending at least partially through said passageway and with the enlarged head being engageable with the supporting shoulder to firmly support said screw;

a nut member threadedly attached to said shank portion of said screw member, said nut member having a neck portion extending through the aperture in the second member and into engagement with the relatively hard bearing surface of the insert whereby the nut member is prevented from bearing directly on the first member, said neck portion having a lesser lateral dimension than the aperture in the second member to allow the first member to move laterally relative to the second member;

means associated with the nut member for urging the first and second members together as the nut member is tightened; and means for preventing the nut member from forcefully rubbing against the second member as the interconnected first and second members move relative to each other.

7. An insert as defined in claim 6 including a washer surrounding said insert, said washer defining an electrically conductive path.

8. In a fastener for interconnecting first and second members wherein each of the members has an aperture therein with the apertures being generally confronting, the combination of:

an insert positionable within the aperture of the first member and having a passageway extending therethrough, said insert having a relatively hard bearing surface adjacent the aperture of the second member, said first member having an inner face confronting the second member and said bearing surface of said insert is substantially flush with said inner face of said first member;

means for rigidly mounting said insert within the aperture of the first member to substantially prevent relative longitudinal movement therebetween;

a first fastener element having an enlarged head and a shank portion, said first fastener element being positionable within said passageway in said insert with the shank portion extending at least partially through said passageway and with the enlarged head preventing the first fastener element from passing completely through said passageway; and a second fastener element attachable to said shank portion of said first fastener element, said second fastener element having a neck portion extendible through the aperture of the second member and further having a retainer portion, said retainer portion being wider than the aperture in the second member to allow the fastener to interconnect the first and second members, at least one of said second fastener element and said insert extending at least partially through the aperture in the second member to cause engagement between the relatively hard bearing surface on the insert and the neck portion of said second fastener element when the fastener is interconnecting the first and second members to thereby prevent the second fastener means from causing failure of the first member.

9. A combination as defined in claim 8 wherein the first member has an inner face and the aperture therethrough is enlarged at said inner face to define a shoulder and said means for mounting includes a retaining ring mountable on said insert and engageable with the shoulder of the first member.

10. A combination as defined in claim 8 including a conductive washer for at least substantially surrounding said insert.

11. A combination as defined in claim 8 including means for urging the first and second members together as the fastener elements are tightened, means for permitting limited relative lateral movement between said first and second members and means for preventing the second fastener element from forcefully rubbing against the second member during said relative lateral movement.

12. A panel construction attachable to a member with first and second fastener elements comprising:

a panel including a substantially nonconductive core and a conductive face sheet secured to said core, said panel having a surface defining an aperture which extends through said core and said face sheet;

an insert having a generally central passageway therethrough and adapted to be received in the aperture in the panel, said insert being constructed of a harder material than the panel, said insert being electrically conductive;

said insert having an enlarged portion adjacent one end thereof, said insert defining a first bearing surface adjacent said one end thereof against which the first fastener element can bear;

said insert defining a second bearing surface adjacent the other end thereof against which the second fastener element can bear;

means for mounting said insert within the aperture of the panel; and a conductive washer having a first portion receivable between said enlarged portion of said insert and said surface and a flange portion extending radially outwardly of said insert adjacent said one end thereof, said flange portion extending radially outwardly sufficiently to contact the conductive face sheet of the panel when said insert and said conductive washer are mounted on the panel.

13. An insert combination as defined in claim 12 wherein said conductive washer is constructed of resilient material and said flange portion is resiliently urged against the conductive face sheet of the panel when said insert is mounted within said aperture of the panel.

References Cited

UNITED STATES PATENTS

| | | | |
|---|---|---|---|
| 2,283,526 | 5/1942 | Albin | 24—221.2 |
| 2,320,947 | 6/1943 | Martin et al. | 151—38 |
| 2,360,274 | 10/1944 | Rapp | 151—69 |
| 2,438,028 | 3/1948 | Allen | 24—221.2 |
| 2,853,112 | 9/1958 | Poupitch | 151—69 |
| 2,949,143 | 8/1960 | Shur. | |
| 3,346,032 | 10/1967 | Gulistan | 151—69 |
| 3,389,736 | 6/1968 | Gulstan. | |

FOREIGN PATENTS

| | | | |
|---|---|---|---|
| 828,194 | 2/1960 | Great Britain | 151—69 |

EDWARD C. ALLEN, Primary Examiner

U.S. Cl. X.R.

85—50; 151—38, 41.72, 41.76, 69